Figure 1:
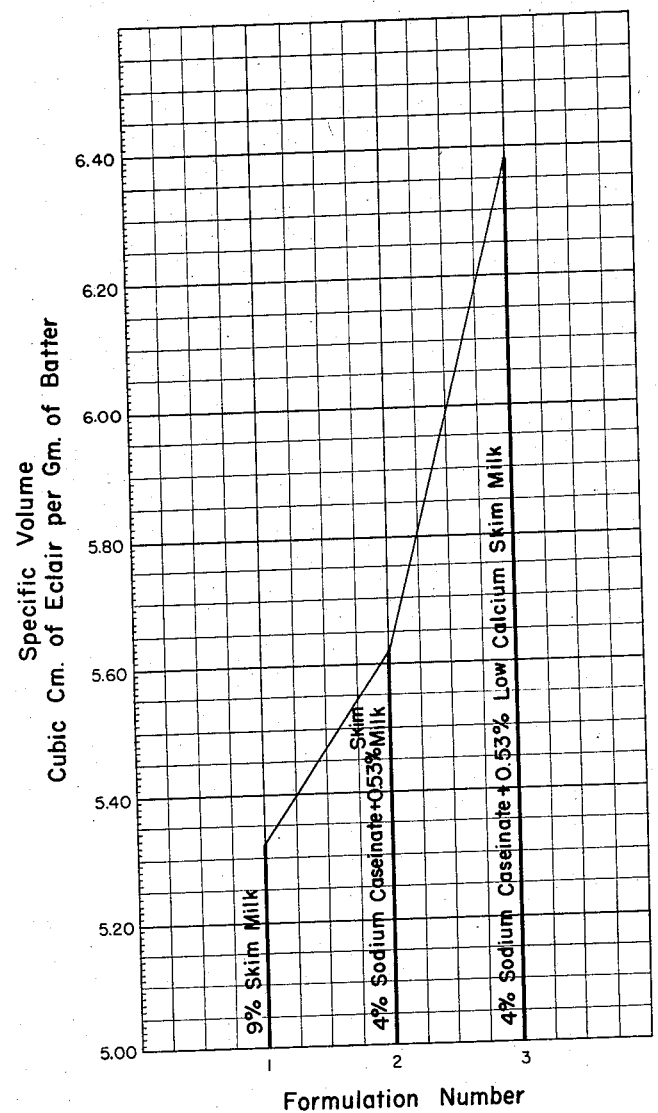

Feb. 17, 1959 S. W. ARENSON ET AL 2,874,050
COMPOSITION AND METHOD OF MAKING SAME
Filed Dec. 14, 1955 3 Sheets-Sheet 1

FIG. I.

INVENTORS
SIMON W. ARENSON &
FRANCIS A. BALDAUSKI
BY
their ATTORNEYS

Feb. 17, 1959  S. W. ARENSON ET AL  2,874,050
COMPOSITION AND METHOD OF MAKING SAME
Filed Dec. 14, 1955  3 Sheets-Sheet 2

INVENTORS
SIMON W. ARENSON &
FRANCIS A. BALDAUSKI
BY
their ATTORNEYS

Feb. 17, 1959  S. W. ARENSON ET AL  2,874,050
COMPOSITION AND METHOD OF MAKING SAME
Filed Dec. 14, 1955  3 Sheets-Sheet 3

INVENTORS
SIMON W. ARENSON &
FRANCIS A. BALDAUSKI
BY
their ATTORNEYS 2,874,050
Patented Feb. 17, 1959

United States Patent Office

2,874,050
COMPOSITION AND METHOD OF MAKING SAME

Simon W. Arenson, Baltimore, Md., and Francis Algerd Baldauski, Norwich, N. Y., assignors, by mesne assignments, to National Dairy Products Corporation, New York, N. Y., a corporation of Delaware Application December 14, 1955, Serial No. 553,122

7 Claims. (Cl. 99—94)

This invention relates to baked products and especially to those in which egg is an ingredient.

In preparing batter and dough for bakery and home-baked products, the conventional ingredients include flour, shortening, sugar, egg, leavening, salt, flavoring and water, and in many cases starch and milk or milk solids. The egg is an important ingredient in practically all compositions because the egg imparts certain qualities which are of critical importance, depending upon the type of product and the manner in which it is cooked. Fat fried products such as chemically leavened doughnuts, yeast raised doughnuts and French crullers, for example, should have a moderately high volume and a relatively smooth, non-porous, skin-like surface. The high volume causes the doughnuts to float in the fat with minimum immersion so as to decrease the extent of contact of the doughnut with the fat and thereby minimize the absorption of fat by the doughnut. The smooth surface of the doughnut likewise tends to seal the surface and prevent fat absorption. Low fat absorption is important not only as an economy measure but also to make a product which is digestible and to which the coating of powdered or glazed sugar may adhere. The egg content of the doughnut dough is important in providing the necessary volume and surface characteristics of the product. In yeast raised products which contain eggs such as coffee cake, and in chemically leavened products which contain eggs such as white and yellow cakes, the volume is also important.

In both fat fried and oven baked products whether yeast raised or chemically leavened, staling is ordinarily a serious problem. Staling is thought to be caused more by a redistribution of moisture within the cake than by a loss of moisture, since staling may occur even though the product is sealed in a vapor-tight container. The quality and quantity of egg used has an important effect on the staling characteristics of the product and accordingly must be given serious consideration in formulating a batter or dough for any fat fried or oven baked product.

In preparing eclairs, popovers or cream puffs, the formation of a relatively thin shell having an open center is important, and the egg content and quality have an important bearing on the formation of the desired structure. The volume and texture of layer cakes are important quality factors, which are largely dependent upon the egg content.

The egg is not only one of the most important ingredients of baked products but unfortunately it is one of the most expensive. Accordingly, it is of general interest to most expensive. Accordingly, it is of general interest to reduce, insofar as possible, the egg content of baked goods consistent with satisfactory quality and/or increase the efficiency of the egg so that lesser amounts of egg may be used or improved performance may be obtained with the same amount of egg.

In an effort to facilitate large-scale bakery operations and also with the factor of economy in mind, the baking trade has developed in recent years the use of powdered, i. e., spray-dried, whole eggs and egg yolks in bakery and home-baked products. However effective and efficient methods of dehydration are in the preservation of the egg and all its qualities, powdered eggs have not been as effective in baking systems in many respects as fresh or frozen eggs. The handicap has been especially important in the case of hollow-center high volume baked products such as eclairs, popovers and cream puffs, since for some reason, the exact nature of which is not clearly understood, use of these substitutes has not been successful in duplicating the results obtainable with fresh eggs.

In spite of the potential which the egg has in producing desirable high volume in the baked goods, when the egg is incorporated in the batter as in the manufacture of layer cakes and popovers, its immediate effect is to cause a reduction in the air incorporation and a resultant decrease in the batter specific volume. In some cases, this effect may not be a serious disadvantage, but in other instances, particularly in the case of popovers and chemically leavened cakes, where air incorporation is necessary and desirable, it would be an advantage to overcome the depressing effect that the yolk has upon air incorporation.

It is an object of the invention to provide a way of enhancing the effectiveness of eggs in compositions used in the preparation of baked goods.

Another object of the invention is to prepare compositions for making baked goods which contain less than the normal amount of eggs but have substantially the same qualities, or better qualities, than similar products prepared with the normal amount of eggs.

Still another object of the invention is to prepare a bodified egg composition which has a substantially greater power to produce the desired qualities in baked goods normally imparted by the egg.

Another object is to provide a method for enhancing the incorporation of air in batters and doughs containing egg.

Another object of the invention is to improve the performance of powdered egg in bakery products and make it resemble more closely the performance of fresh egg in these applications.

Other objects and advantages of the invention will appear from the description herein presented.

According to the invention, there is added to a cake mix or batter containing egg an amount of a partially or substantially entirely decalcified milk, as more fully described hereinafter, the amount being sufficient to enhance the qualities of the baked product that are normally produced by eggs. A particular feature of the invention is that the decalcified milk may be mixed with the egg yolk or whole egg either prior to or after dehydration in an amount within the ranges hereinafter described so that the mixture, when used in the preparation of baked products, has a substantially increased effectiveness per unit weight of egg yolk solids, as compared with the egg alone.

In practicing this invention the types of flour used are those normally used by one skilled in the baking art ranging from soft wheat for cake flour to hard wheat used in baking coffee cakes, and belonging in general to the classification of wheat outlined on page 193 of "Baking Science and Technology," volume 1, by E. J. Pyler, Siebel Publishing Company, Chicago, Illinois, 1952.

Decalcified milk is a product of commerce made by removing the calcium ion from skim milk, as by passing the milk through a bed of ion exchange resin of known type. Skim milk is preferably used, and the decalcified liquid may be dehydrated to a powder in a drum or spray drier. The degree of decalcification may vary from 35 to 95% or greater, but it is preferred that the decalcification be as complete as feasible. In defining the amounts of decalcified milk in the compositions of the invention, the amounts equivalent to 100% decalcification and on a non-fat dry basis are referred to, and correspondingly larger amounts are used if the percent decalcification is less. That is, if "$x$" parts of decalcified milk are required and the milk used is only 50% decalcified, then $2x$ parts will be used, and so on. The range of percent decalcification for the purposes of the invention is defined on the basis of an initial calcium content of 1.3% by weight in the undecalcified non-fat milk solids. The calcium content of the decalcified milk solids may be computed directly from the percent decalcification and this initial calcium content.

The amount of decalcified milk employed in the composition of the invention is partially defined with reference to the quantity of flour. The amount is sufficient to produce the desired characteristics in the final baked product and will vary depending upon the demands of that product, whether it be eclairs, layer cakes or doughnuts. Generally, the effective amounts are within the range of 1 to 20% of equivalent 100% decalcified milk, based on the weight of the flour. Preferably, the decalcified milk is present in the approximate range of 2 to 16%. However, in the case of doughnuts and layer cakes, volumes of the order of eclair volumes are undesirable and accordingly doughnut or layer cake doughs or batters will preferably contain 1 to 10% decalcified milk based on the weight of flour.

Inasmuch as the purpose of using the decalcified milk is to enhance the properties and function of the egg in imparting the desired properties to the baked product, the amount thereof is also referred to the quantity of egg. A beneficial effect may be noted in amounts above about 2%, while a more substantial beneficial effect may be noted if the amount of decalcified milk is at least about 10% of the combined weights of egg yolk solids and low calcium non-fat milk solids. At least about 50% decalcified milk, based on the combined weights of yolk solids and low calcium non-fat milk solids, may be added while still retaining marked advantages of the invention. A preferred range of decalcified milk solids is 10 to 40% on the same basis. As hereinbefore indicated, the decalcified milk may be added to and mixed with the egg before or after drying and the mixture then added to the batter or dough or combined with the other ingredients of a dry prepared mix.

In making compositions for baking, known techniques may be employed. In bakery practice and also in preparing ready-made compositions for home use, the ingredients are frequently mixed in a dry form and water or milk is added just before baking to form a dough or batter of the desired consistency. However, other procedures, such as those commonly used for home baking or baking smaller quantities, may be used in the practice of the invention. For example, when making layer cakes having larger air bubbles and high batter volume, the shortening and sugar are first mixed to form a homogeneous "cream," followed by addition of eggs and then alternate portions of flour and milk, the salt and leavening being added with the flour. In another method designed to produce a cake with finer texture, the shortening, flour and if desired also the sugar, baking powder and salt, are first mixed, followed by the eggs and milk together.

The theory and mechanism of the action of the decalcified milk in increasing the efficiency of the egg in baking operations is not entirely clear. It is thought that the mechanism may be one involving plasticizing of the proteins of the flour and egg by the decalcified milk, since the latter, as contrasted with most other proteins is a non-heat-coagulating protein and hence its plasticizing effect may extend for a longer period during the baking operation so as to permit greater expansion of the dough or batter. It is possible, also, that there is a tendency of the decalcified milk to seal the surface of the baked goods, thereby to prevent escape of moisture and gases which tend to produce the high volume. Moreover, when using the powdered egg, which as indicated before is quite common in baking compositions today, the egg protein has become somewhat denatured and this tends to have a deleterious effect on the baked product. By using the decalcified milk according to the invention, the superior plasticizing properties thereof tend to promote hydration of the egg protein so as to bring about a material beneficiation of the egg protein in the batter and during the baking operation. This is important to the baker, as it provides him with an increase in yield of baked items from the same amount of ingredients and assures him a product of acceptable quality even when frozen eggs or powdered eggs are substituted for fresh eggs, or when careless mixing technique has been used in the preparation of the batter. Particularly in the case of the prepared "dry mix" formulas, use of decalcified milk is important since it makes possible successful formulations in a field where formulations of standard ingredients have to date been ineffective.

For the standard ingredients of the composition, there may be substituted any of a wide range of equivalents. As a sugar, for example, there may be used cane sugar, corn sugar, corn syrup, beet sugar, etc., while the fats include esterified lard, hydrogenated vegetable oil and others. The category of starch includes wheat starch, potato flour, tapioca, soy flour and others. The leavening agents include pyrophosphate, yeast, sodium bicarbonate, glucono delta lactone and cream of tartar. In place of milk, non-fat milk solids such as roller-dried skim milk powder and high heat skim milk powder may be used. Baking temperatures are those commonly used in the art.

Low calcium skim milk powder, which is an article of commerce prepared by passing skim milk through an ion exchange resin bed to remove 35 to 95% of the calcium, may be used with advantage.

Sodium caseinate or other monovalent metal or ammonium salts of casein, prepared by re-dissolving the precipitated and filtered curd of skim milk in an appropriate alkali according to known procedure, and drying the salt, may be used with advantage with the decalcified milk. The caseinate exerts a like effect in the cooked product, and accordingly the amount of decalcified skim milk solids may be reduced by the amount of caseinate added.

Following are examples of several embodiments of the invention.

EXAMPLE 1

The following coffee cake dry mix was prepared as a control, the percentages being on a weight basis.

| | Percent |
|---|---|
| Hard flour | 65.18 |
| Cane sugar | 12.67 |
| Corn sugar | 1.00 |
| Esterified lard | 11.12 |
| Egg yolk solids | 1.97 |
| Roller-dried skim milk | 3.56 |
| High heat spray milk | .71 |
| Potato flour | 1.20 |
| Salt | 1.00 |

A similar mix designated as Formula 1 was prepared in which the yolk was replaced by a mixture of 0.5% decalcified skim milk solids (95.4% calcium removed) and 1.47% yolk solids, making a total of 1.97%, which is the same as the yolk content of the control mixture. A third mix, designated as Formula 2, was the same as the control except that the yolk was replaced with 1.0% low calcium skim milk solids and 0.97% yolk solids. Each of the compositions was mixed with water in the proportion of 2270 parts of mix to 937 parts of water and 85 parts of yeast, to prepare a dough. The composition was first mixed for one minute at the lowest mixer speed (50 R. P. M.), followed by 7 to 10 minutes at the medium speed (80 R. P. M.). The dough was fermented at 20° C. for 60 minutes. It was permitted to proof for 60 minutes at 80° F. following which it was baked at 375° F. for 19 minutes. Forty duplicate tests were carried out on each of the control and Formulas 1 and 2. The products were compared on the basis of specific volume, that is, cubic centimeters of baked product per gram of dough, and keeping quality of the product, i. e., staling rate. The volume was measured using standard seed displacement technique. The staling rate was determined by employing a standard "Farinograph" as follows.

The cakes to be tested were stored in vapor-tight containers for 24, 48 and 72 hours after baking, depending upon the storage time desired for test. 300 grams of cake were macerated into the Farinograph bowl. 120 cc. of distilled water were added to the mass and the Farinograph motor was started and run for a period of ten minutes or more, generally eighteen minutes. Viscosity measurements were recorded continuously on a chart and varied periodically over a range of values depending upon the characteristics of the slurry. The freshness of the product was determined by reading the band width, the maximum and minimum viscosities, and the time required to reach a substantially constant viscosity. The wider the band the fresher the product. Continuing high viscosity and band width indicates freshness retention. A narrow band and lower viscosity indicates staling. The greater the time required to reach a substantially permanent viscosity, the fresher is the product. In the following table there are presented the average of the measurements on the forty separate samples for each of the formulas and control described above.

| Formula No. | Average specific volume, cc./gm. of batter | Farinograph measurements (Brabender units) | | | |
|---|---|---|---|---|---|
| | | Band width | Maximum viscosity | Minimum viscosity | Time to reach constant viscosity, minutes |
| Control | 5.84 | 20 | 260 | 260 | 5 |
| 1 | 6.71 | 30 | 295 | 295 | 6 |
| 2 | 6.35 | 30 | 295 | 295 | 6 |

EXAMPLE 2

A cake doughnut dry mix composition was prepared as a control according to the following formula, the percentages being on a weight basis.

|  | Percent |
|---|---|
| Soft flour | 59.96 |
| Cane sugar | 21.68 |
| Corn sugar | 2.25 |
| Liquid vegetable oil | 3.50 |
| Egg yolk solids | 2.00 |
| Skim milk powder | 4.25 |
| Sodium acid pyrophosphate | 1.11 |
| Sodium bicarbonate | 0.75 |
| Salt | 1.00 |
| Soya flour | 3.00 |
| Potato flour | 0.50 |

A Formula No. 1 was prepared, identical with the control except that the 2.0% yolk solids was replaced with 1.6% yolk solids and 0.4% of decalcified milk solids (95.4% calcium removed). A second formula was also prepared, identical with the control except that the yolk solids were replaced with 1.6% yolk solids and 0.2% sodium caseinate and 0.2% low-calcium skim milk solids. A third formula was prepared also identical with the control, except that the egg was replaced by 1.5% yolk solids and 0.5% low calcium skim milk solids. In preparing the doughnuts, 2270 parts by weight of the mix of each composition were mixed with 908 parts of water to make the dough. The dough at a temperature of 78° F. was fried in deep fat at 375° F., after being cut into 1¾-inch cuts on a standard machine at the rate of 8 cuts per minute. The weight of the cuts was 12 ounces per dozen. The fried doughnuts were appraised for shape, texture, flavor, volume, fat absorption and other quality factors, and the results of a number of tests are summarized in the following table. The keeping quality was determined by the Farinograph testing procedure described in Example 1.

|  | Control | Formula 1 | Formula 2 | Formula 3 |
|---|---|---|---|---|
| Shape | Good | Good | Good | Good. |
| Crust character | Skin | Skin | Skin | Skin. |
| Skin color | Gold | Gold | Gold | Gold. |
| Bloom at turner | Wet | Wet | Wet | Wet. |
| Internal color | Yellow | Yellow | Yellow | Yellow. |
| Crumb texture | Flake | Flake | Flake | Flake. |
| Taste and eating | Good | Good | Good | Good. |
| Seconds to rise | 3-4 | 3-4 | 3-4 | 3-4. |
| Keeping quality | Very good | Very good | Very good | Very good |
| Specific volume | 3.45 | 3.50 | 3.60 | 3.60. |
| Fat absorption per 12-oz. doughnut dozen | 1.7 | 1.65 | 1.65 | 1.65. |

Tensile strength and compressibility measurements were also made on the doughnuts at regular intervals after baking, during which intervals the doughnuts were stored in vapor-tight containers. The compressibility was determined by compressing the doughnut between the end of a rod ½ inch in diameter and a plate, applying a constant weight of 250 grams compression. The compression was measured in thousandths of an inch per minute. The tensile strength was determined by holding a doughnut in a vertical position between two U-shaped members looped through the hole and applying force at a constant rate. The gram weight force required to initiate break was recorded. The average results of the measurements are summarized in the following tables.

*Compressibilities (.001 inch per minute)*

STORAGE TIME—HOURS

|  | 24 | 48 | 72 |
|---|---|---|---|
| Control | 119 | 98 | 82 |
| Formula 1 | 130 | 105 | 86 |
| Formula 2 | 140 | 115 | 90 |
| Formula 3 | 150 | 127 | 99 |

*Tensile strengths (grams)*

STORAGE TIME—HOURS

|  | 0 | 24 | 48 | 72 |
|---|---|---|---|---|
| Control | 33 | 49 | 82 | 119 |
| Formula 1 | 33 | 40 | 70 | 95 |
| Formula 2 | 33 | 38 | 74 | 98 |
| Formula 3 | 33 | 37 | 60 | 92 |

EXAMPLE 3

Eclairs were made from the following ingredients by a wet mix procedure.

|  | Weight percent | Weight percent dry basis |
|---|---|---|
| Basic ingredients: | | |
| Water, 1 qt | 28.88 | |
| Shortening, 1 lb | 14.45 | 34.0 |
| Salt, ½ oz | 0.45 | 1.06 |
| Strong bread flour, 1 lb. 6 oz | 19.90 | 46.76 |
| Frozen whole eggs (should be completely thawed before using), 1 qt | 28.90 | 17.65 |
| Additional ingredients: | | |
| Water, ½ pt | 7.20 | |
| Ammonium carbonate, ¼ oz | 0.22 | 0.53 |
|  | 100 | 100 |

The first portion of water, salt and shortening were placed in a kettle and brought to a brisk boil. The flour was added and the mixture stirred until it became a smooth paste. The paste was put into a mixing machine kettle and while the machine was operated at a slow speed the egg and decalcified milk solids (in amount described hereinafter) mixture was added gradually. The decalcified milk-egg mixture was prepared by adding all the decalcified milk to the eggs and partially dispersing it by stirring. The mixture may be used even though some lumps remain therein. When about ¾ of the eggs had been added, the mixer was stopped, the sides of the kettle were scraped down, and the rest of the eggs were added while operating the mixer at second speed. The ammonium carbonate was dissolved in a small amount of water and mixed into the batter, and additional water was added to produce the desired consistency. In baking the eclairs, the proper amount of batter was deposited with a plain tube on a very slightly greased pan and baked at 450° F. From each batter, eight eclairs were dressed on the pan and weighed before and after baking. Volume measurements were made and volume per gram of batter was calculated. A series of formulations were prepared, but containing different amounts of decalcified milk and in some instances other milk products. The control and the various formulations were prepared and baked under identical conditions. The results of the volume measurements are presented in the following table and described graphically in Figure 1.

| Formulation number | Percent decalcified milk [1] based on flour | Percent decalcified milk based on yolk solids | Other milk products based on flour | Specific volume, cc./gm. batter |
|---|---|---|---|---|
| 1 | | | 9% skim milk [2] | 5.32 |
| 2 | | | 4.0% sodium caseinate; .53% skim milk. | 5.62 |
| 3 | 0.53 | 2.05 | 4.0% sodium caseinate | 6.38 |

[1] (95.4% of the calcium removed; .06% calcium content.)
[2] 1.3% calcium content.

EXAMPLE 4

Figure 2:
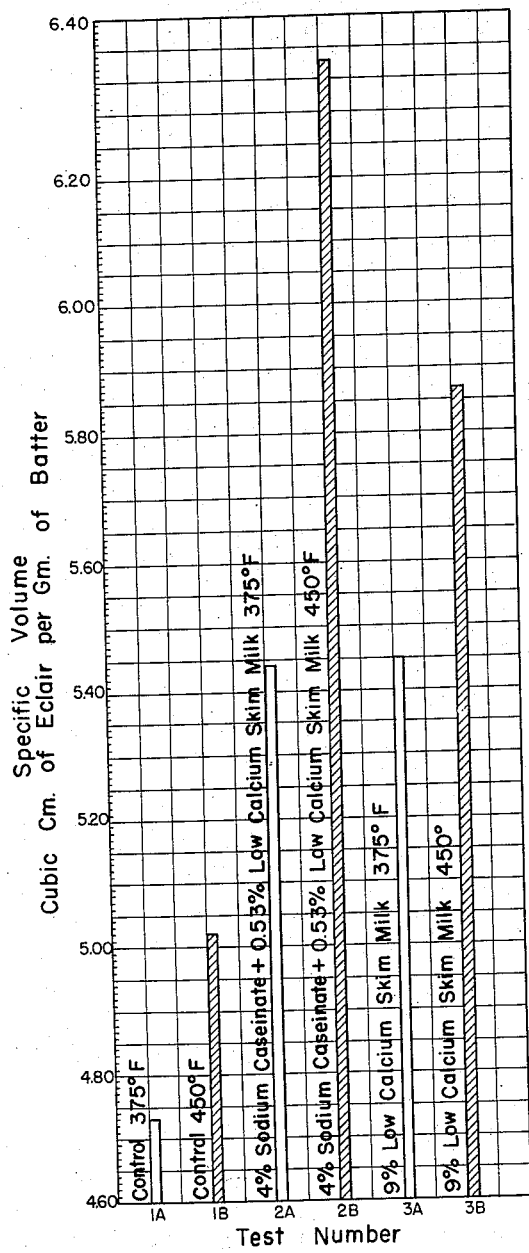

Eclair batters were prepared based on the same formulation and using the same mixing technique described in Example 3, except that some of the products were baked at 375° F. and others at 450° F. The additives, baking conditions and results of volume tests on the product are summarized in the following table, and the specific volumes are reported graphically in Figure 2 of the attached drawings.

| Test No. | Baking temp. | Percent decalcified milk solids | | Other milk products based on flour | Specific volume, cc./gm. batter |
|---|---|---|---|---|---|
| | | Based on flour | Based on yolk solids | | |
| 1A | 375 | None | Control | | 4.73 |
| 1B | 450 | None | do | | 5.02 |
| 2A | 375 | 0.53 | 2.05 | 4% sodium caseinate | 5.44 |
| 2B | 450 | 0.53 | 2.05 | do | 6.38 |
| 3A | 375 | 9.00 | 34.1 | None | 5.45 |
| 3B | 450 | 9.00 | 34.1 | do | 5.87 |

EXAMPLE 5

Figure 3:
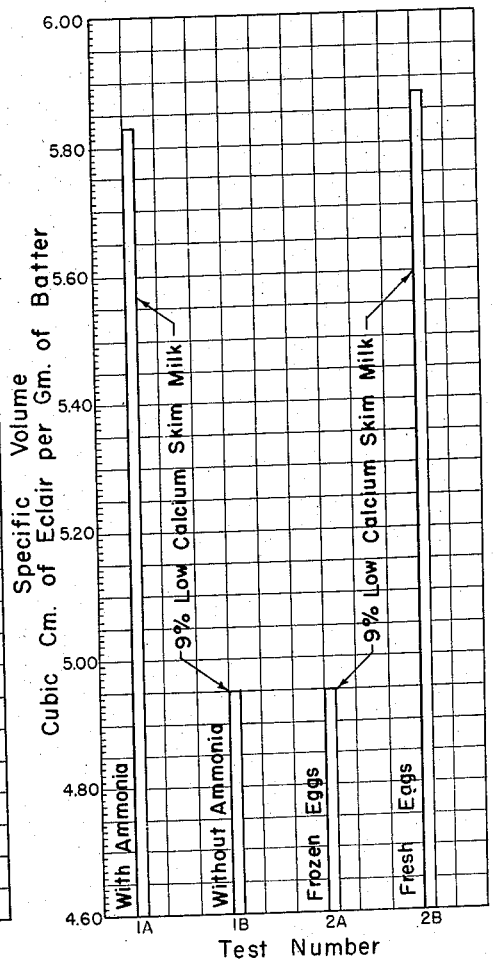

Eclairs were baked according to the procedure and using the type of mix described in Example 3, except that fresh eggs were used in some of the tests and frozen eggs in others, and ammonium carbonate was omitted from some of the compositions. The amount of decalcified skim milk solids (95.6% of the calcium removed) was 9.0% based on the flour, 34.1% based on the yolk solids. Variations in composition and the results of the volume measurements on the products are presented in the following table and described graphically in Figure 3 of the attached drawings.

| Test No. | Type of eggs | Ammonium carbonate | Specific volume, cc./gm. batter |
|---|---|---|---|
| 1A | Frozen | Yes | 5.83 |
| 1B | do | No | 4.95 |
| 2A | do | No | 4.95 |
| 2B | Fresh | No | 5.88 |

EXAMPLE 6

A dry mix composition for yellow layer cake was prepared according to the following formula as a control, the percentages being expressed on a weight basis.

|  | Percent |
|---|---|
| Cake flour | 37.06 |
| Cane sugar | 37.06 |
| Hydrogenated vegetable oil | 13.37 |
| Dry egg yolk solids | 4.00 |
| Dried egg albumen | 1.00 |
| Skim milk solids | 4.58 |
| Sodium acid pyrophosphate | 1.16 |
| Sodium bicarbonate | 0.77 |
| Salt | 1.00 |

Modified formulations were prepared, based on the control but altering the 4% yolk solids to 3.2% yolk solids, 0.6% sodium caseinate and 0.2% low calcium skim milk solids for Formulation No. 1; 3.6% yolk solids and 0.4% sodium caseinate for Formulation No. 2; and 3.2% yolk solids and 0.4% sodium caseinate and 0.4% low calcium skim milk solids for Formulation No. 3. Batters were prepared from each of the formulas by mixing each with water in the ratio of 3 lbs. of mix to 14 ounces of water at a temperature of 72° F. A three-speed Hobart mixer was used and operated first at low speed for one minute, followed by a 4-minute mixing period at medium speed and a final 1-minute mixing period again at low speed. The batters were poured into 7-inch layer cake pans. 285 grams of batter were placed in each pan and baked in a "Despatch" oven at 367 to 375° F. for 18 to 20 minutes. Measurements were made of moisture lost during baking and volume of the baked cakes. All of the cakes had a golden brown crust. The character of the crust and bloom was normal. The color of the crumb was bright, the grain was fine, and the texture smooth. Twenty test cakes were made from each formulation and the control. The average specific volumes and moisture loss during baking are presented in the following table.

| Formula No. | Specific volume, cc./gm. batter | Moisture loss during baking, percent |
|---|---|---|
| Control | 3.82 | 9.1 |
| 1 | 4.02 | 9.1 |
| 2 | 4.06 | 8.8 |

EXAMPLE 7

Figure 4:
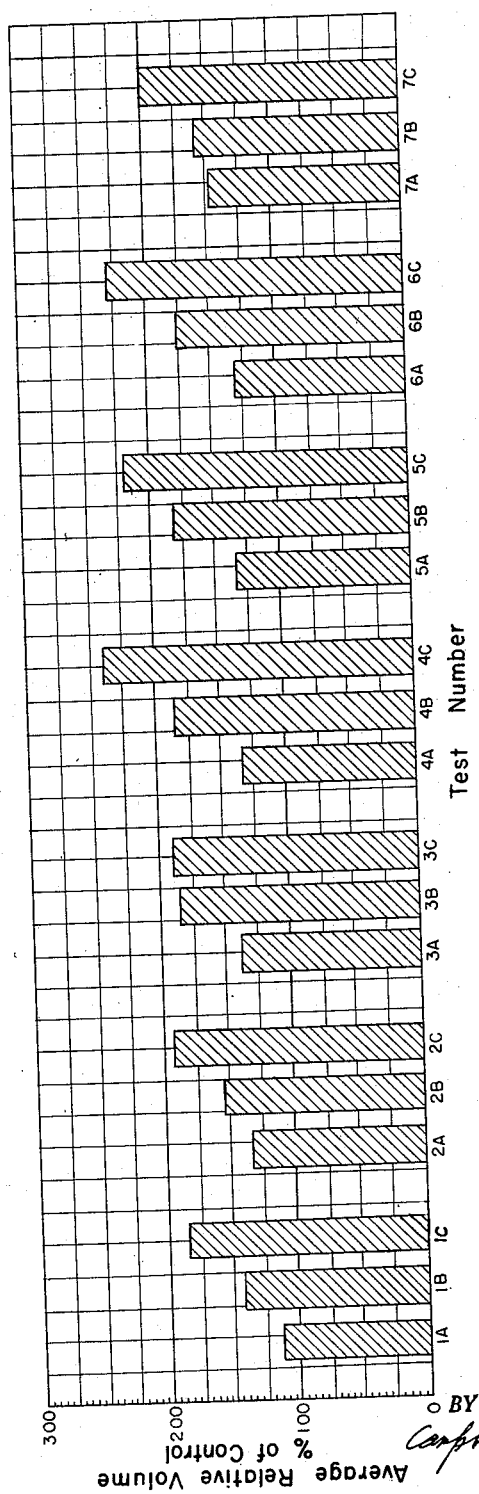

To determine the effect of decalcified milk solids in increasing the volume of egg-flour mixtures, several compositions were prepared containing varying amounts of flour, egg yolk solids, decalcified milk solids and sodium caseinate. Two hundred grams of flour, three grams of salt, and the various indicated additives were placed in a kettle and enough water added so that the kneaded mixture produced a fairly stiff dough. The amounts of the additives were based on the weight of flour. The water addition was variable depending upon the type of flour and the type of additive. A commercial bread flour was employed which is commonly used in baking bread and biscuits. As a control, a mixture of flour, salt and water was tested. Comparative tests were also made on flour, salt, water and egg yolk powder without low calcium milk or sodium caseinate. A number of tests were made for each composition. In each baking, six rolls were made weighing 50 grams each. These were placed on a pan and baked 35 minutes at 375° F. The specific volumes of the baked products were measured, using the standard seed displacement technique. The averages of the specific volumes of the products, expressed as a percentage of the specific volume of the flour-salt-water roll (without egg), are presented in the following table and are shown graphically in Figure 4.

| Test No. | Percent egg yolk powder (based on flour) | Percent sodium caseinate (based on flour) | Percent "Lo Cal" [1] | Percent skim milk solids | Average volume, percent of control |
|---|---|---|---|---|---|
| 1A | 5 | | | | 114 |
| B | 10 | | | | 142 |
| C | 15 | | | | 186 |
| 2A | 4 | | | 1 | 134 |
| B | 8 | | | 2 | 155 |
| C | 12 | | | 3 | 193 |
| 3A | 4 | 1 | | | 138 |
| B | 8 | 2 | | | 186 |
| C | 12 | 3 | | | 190 |
| 4A | 4 | 0.75 | 0.25 | | 134 |
| B | 8 | 1.50 | 0.50 | | 186 |
| C | 12 | 2.25 | 0.75 | | 241 |
| 5A | 4 | 0.50 | 0.50 | | 134 |
| B | 8 | 1.00 | 1.00 | | 183 |
| C | 12 | 1.50 | 1.50 | | 221 |
| 6A | 4 | 0.25 | 0.75 | | 131 |
| B | 8 | 0.50 | 1.50 | | 176 |
| C | 12 | 0.75 | 2.25 | | 231 |
| 7A | 4 | | 1.00 | | 148 |
| B | 8 | | 2.00 | | 159 |
| C | 12 | | 3.00 | | 200 |

[1] Low calcium (95.4% calcium removed by ion exchange) skim milk solids.

EXAMPLE 8

The following yellow cake dry mix was prepared as a control, the percentages being on a weight basis:

| | Percent |
|---|---|
| Cake flour | 37.08 |
| Cane sugar | 37.08 |
| Hydrogenated vegetable oil | 13.39 |
| Powdered yolk solids | 3.97 |
| Egg albumen solids | 0.99 |
| Roller-dried skim milk | 4.59 |
| Sodium acid pyrophosphate | 1.15 |
| Sodium bicarbonate | 0.76 |
| Salt | 0.99 |

A similar mix, designated as Formula 1, was prepared, in which the yolk solids were replaced by a mixture of 3.21% yolk solids and 0.38% low calcium skim milk solids (95.4% calcium removed) and 0.38% sodium caseinate. A second control mix was prepared identical with the first control mix except that the powdered yolk solids and powdered egg albumen were replaced with fresh egg in amount sufficient to provide the same solids content of the egg ingredient. A Formula No. 2 was prepared identical with the fresh egg control except that the yolk solids content was reduced from 3.97% to 3.21% and the difference, i. e., 0.76%, was replaced by 0.38% low calcium skim milk solids and 0.38% sodium caseinate. Each of the compositions was mixed with water in the proportion of 1308 parts by weight of mix to 575 parts by weight of water. The compositions were mixed for a period of 1 minute at low mixer speed (40 R. P. M.), then for 5 minutes at medium speed (65 R. P. M.) and finally one minute at low speed again. The batters were poured into seven-inch pans, 285 grams of batter in each pan, and baked in a "Despatch" oven at 375° F. for 18 minutes. Thirty baking tests were carried out on each composition. Measurements were made on the moisture loss during baking and the volumes of the baked products. The average results are presented in the following table.

| Formula No. | Specific volume, cc./gm. of batter | Moisture loss during baking, percent |
|---|---|---|
| Control (powdered egg) | 3.50 | 9.1 |
| 1 | 3.56 | 8.1 |
| Control (fresh egg) | 3.44 | 8.8 |
| 2 | 3.59 | 8.8 |

EXAMPLE 9

A cake doughnut dry mix composition was prepared as a control according to the following formula, the percentages being on a weight basis.

| | Percent |
|---|---|
| Soft flour | 57.61 |
| Hard flour | 0.95 |
| Cane sugar | 21.67 |
| Corn sugar | 2.25 |
| Soy bean oil | 4.00 |
| Yolk solids | 2.40 |
| Spray-dried skim milk | 4.00 |
| Sodium acid pyrophosphate | 1.29 |
| Sodium bicarbonate | 0.88 |
| Salt | 1.00 |
| Soy bean flour | 3.00 |
| Potato flour | 0.95 |

A first test formula was prepared, identical with the control except that the yolk content was reduced from 2.40 to 1.92% and the difference of .48% was made up by adding 0.24% low calcium skim milk solids (95.4% calcium removed) and 0.24% sodium caseinate. A second control composition was prepared, identical with the first control except that the 2.40 parts of yolk solids were replaced with 4.24 parts of fresh yolk which, however, had a solids content about the same (2.40) as the powdered yolk of the first control formula. A second test formula was prepared, identical with the second (fresh yolk) control except that the 4.24 parts of fresh yolk were replaced with 3.76% fresh yolk and 0.24% low calcium skim milk solids and 0.24% sodium caseinate. In preparing the doughnut batter, 2,226 parts of the composition described above was mixed with 835 parts of water and 88 parts of fresh yolk. In the case of the second (fresh yolk) control and Formula No. 2, the fresh yolk was not incorporated in the composition until the water was added. The temperature of the water was 74° F. and the temperature of the dry mix prior to adding the water was 80° F. The mixing was carried out in a machine for one-half minute at low speed, followed by 1½ minutes at medium speed. The dough, at a temperature of 78° F., was fried in deep fat at 375° F. after being cut into 1¾-inch cuts on a standard machine at the rate of 8 cuts per minute. The weight of the cuts was 12 ounces per dozen. Tests were carried out on each formula and controls, and measurements were made on the fat absorption, tensile strength of the products, specific volume, compressibility and the staling qualities. Measurements were made by the procedures described in Example 2. The results are summarized as averages in the following tables.

| Formula No. | Fat absorption per 12-oz. dozen | Tensile strength | | | Specific volume, cc./gm. batter | Compressibility units | |
|---|---|---|---|---|---|---|---|
| | | 24 hrs. | 48 hrs. | 72 hrs. | | 24 hrs. | 48 hrs. |
| Control (powdered egg) | 2.50 | 70 | 84 | 88 | 3.25 | 277 | 186 |
| Formula 1 | 2.26 | 76 | 80 | 84 | 3.20 | 228 | 199 |
| Control (fresh egg) | 2.35 | 72 | 73 | 88 | 3.35 | 259 | 172 |
| Formula 2 | 2.36 | 78 | 83 | 80 | 3.35 | 279 | 176 |

| Formula No. | Farinograph Measurements | | | | | | | | |
|---|---|---|---|---|---|---|---|---|---|
| | Viscosity | | | | | | Band Width | | |
| | Maximum | | | Minimum | | | | | |
| | 24 hrs. | 48 hrs. | 72 hrs. | 24 hrs. | 48 hrs. | 72 hrs. | 24 hrs. | 48 hrs. | 72 hrs. |
| Control (powdered egg) | 200 | 200 | 180 | 200 | 190 | 175 | 30 | 20 | 20 |
| Formula 1 | 220 | 190 | 175 | 200 | 215 | 185 | 20 | 25 | 25 |
| Control (fresh egg) | 200 | 120 | 175 | 200 | 115 | 170 | 30 | 20 | 20 |
| Formula 2 | 240 | 150 | 215 | 230 | 150 | 200 | 30 | 30 | 30 |

EXAMPLE 10

Eclair batters were prepared on the same formulation and using the same mixing technique as that described in Example 3. Additional amounts of low calcium skim milk solids having 0.06% calcium content and of non-fat milk solids having a calcium content of 1.30%, were also incorporated in the mixture, the proportions of each of such additives varying but the total being a constant 9.0% based on the weight of flour. The results of volume measurements made on the baked eclairs are presented in the following table.

| Percent additive based on flour | | Percent calcium [2] | Specific volume, cc./gm. batter |
|---|---|---|---|
| "Lo Cal" [1] | Non-fat milk solids | | |
| 9 | None | .06 | 6.34 |
| 8.52 | .48 | .11 | 6.32 |
| 7.58 | 1.42 | .25 | 6.12 |
| 6.63 | 2.37 | .38 | 5.80 |
| None | 9.00 | 1.30 | 5.18 |

[1] 95.4% calcium removed.
[2] Based on total skim milk solids.

We claim:

1. A composition adapted to be used in preparing edible baked and fried products, said composition comprising flour, egg yolk and ion exchange decalcified milk solids, the degree of decalcification of the milk solids being at least 35% and the amount thereof equivalent to 1 to 20% of 100% decalcified milk solids based on the weight of flour, and 2 to 50% based on the combined weights of yolk solids and equivalent 100% decalcified milk solids.

2. A composition as described in claim 1 in which the amount of decalcified milk solids equivalent to 100% decalcification is in the approximate range of 10–30% of the combined weights of yolk solids and decalcified milk solids.

3. A dry pre-mixed composition as described in claim 1 for fat-fried products in which the decalcified milk solids content is equivalent to 1 to 10% of 100% decalcified milk solids based on the weight of flour.

4. A dry pre-mixed composition as described in claim 1 for baked products of uniform cell structure in which the decalcified milk solids content is equivalent to 2 to 16% of 100% decalcified milk solids based on the weight of flour.

5. The method which comprises preparing a mixture of the composition described in claim 1 with shortening, leavening and water and heating the mixture at temperature and for time to produce a cooked product.

6. A composition as described in claim 1 in which the egg yolk is powdered.

7. A composition adapted to be used in preparing edible baked and fried products, comprising egg yolk and a decalcified milk solid having at least 35% of the calcium removed therefrom by ion exchange, the amount of decalcified milk solids being equivalent to 2 to 50% of 100% decalcified milk solids based on the combined weight of yolk solids and equivalent 100% decalcified milk solids.

References Cited in the file of this patent

UNITED STATES PATENTS

| 603,165 | Bernstein | Apr. 26, 1898 |
| 1,373,651 | Cullen | Apr. 5, 1921 |
| 1,609,617 | Frohring | Dec. 7, 1926 |
| 1,954,769 | Lyman | Apr. 10, 1934 |
| 2,045,097 | Otting | June 23, 1936 |
| 2,346,844 | Hull | Apr. 18, 1944 |
| 2,739,898 | Kumetat | Mar. 27, 1956 |